United States Patent Office 2,865,474
Patented Dec. 23, 1958

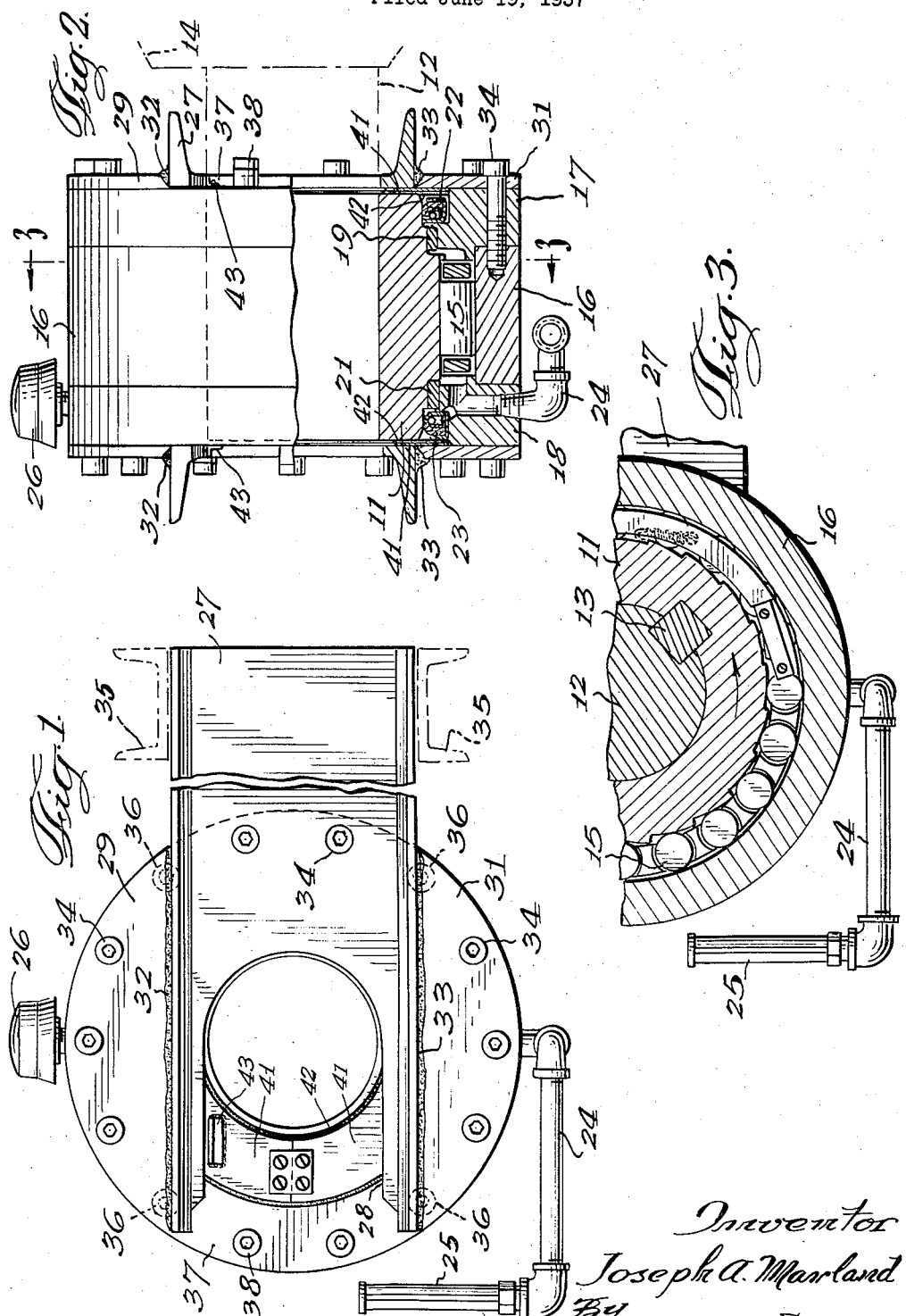

2,865,474
ONE-WAY AUTOMATIC BACKSTOPS

Joseph A. Marland, La Grange, Ill., assignor to Marland One-Way Clutch Co., La Grange, Ill.

Application June 19, 1957, Serial No. 666,702

7 Claims. (Cl. 188—82.84)

The present invention relates to backstops, and more particularly to an improved channel arm construction for one-way automatic backstops.

A backstop comprises a cam unit adapted to be connected to the shaft of a machine, a roller assembly surrounding the cam unit, and an outer race for the roller assembly. The outer race is to be held in a relatively fixed position by a pair of channel arms having their ends in engagement with a fixed anchorage. In some installations, these channel arms may be provided with apertures through the bottom web portion so that the arms and backstop mechanisms, as an assembled entity, can be connected to the machine. In other installations it is not convenient or possible to connect an assembled backstop mechanism together with the channel arms to the shaft of a machine, and hence a different form of backstop channel must be provided. It had been proposed to cut a U-shaped recess in the bottom web of the channel to permit the channel to be attached subsequent to the installation of the backstop mechanism. When this type of construction is employed, it is found necessary to increase the dimensions of the channel members, and an appreciable amount of machining is necessary to prepare such members for installation. In spite of increased size, difficulties were encountered so that the channel arms occasionally buckled or failed to hold. It, therefore, is desirable to provide an improved construction which overcomes the disadvantages thus far encountered.

It is, therefore, an object of the present invention to provide an improved construction of a one-way automatic backstop.

Another object of the invention is to provide improved channel arms for one-way automatic backstops.

Another object of the invention is to provide improved channel arms which will reduce the amount of machining required in their manufacture, and which will be economical to make.

Still another object of the invention is to provide an improved backstop channel arm which has greater rigidity than prior arms, and which can be applied to or removed from an installed backstop mechanism.

A further object of the invention is to provide an improved backstop channel arm which has extension portions in engagement with the cover of the backstop mechanism.

Other and further objects of the invention subsequently will become apparent by reference to the following description taken in conjunction with the accompanying drawing, wherein:

Figure 1 is a side elevational view of a backstop and the channel arms;

Figure 2 is an end elevational view of the backstop and channel arms showing in a broken away portion the internal construction; and Figure 3 is a partial cross-sectional view as seen in the direction of the arrows along the line 3—3 of Figure 2.

Referring to Figures 1 and 2, there is shown a backstop provided with channel arms with the channel arms in the preferred position. Preferably the channel arms should be horizontal, although they may be located at an angle to the horizontal where other installation considerations would require such an arrangement. The backstop mechanism comprises a cam unit 11 adapted to be connected to a shaft 12 by a suitable key 13 as shown in Figure 3. The dotted line representation 12 of a shaft shows the relation of the shaft to a mechanism having a housing 14 and to the backstop as shown in Figure 2. Surrounding the cam unit 11 is a roller assembly 15, which in turn is surrounded by an outer race 16. The outer surface of the race 16 forms a portion of the outer surface or casing of the backstop mechanism as may be seen from Figure 2.

Two annular covers 17 and 18 engage the sides of the race 16 and enclose the roller assembly 15. Interposed between the cover 17 and the cam unit is a bronze bearing member 19. A similar bronze bearing member 21 is interposed between the cam member 11 and the cover 18. A suitable annular gasket 22 is interposed between the cover 17 and the cam unit 11. On the other side, a similar oil seal and gasket 23 are provided between the cam unit 11 and the cover 18. The cover 18 is connected to a pipe 24 which is connected to an oil level sight gauge 25. Except for the manner in which the covers 17 and 18 are secured to the outer race 16, the construction thus far described is conventional and will readily be understood by those skilled in the art. At the top of the backstop mechanism there is provided a breather filter 26, since the internal unit is filled with oil to a certain level on the gauge 25.

In accordance with the present invention, the covers 17 and 18 are provided with suitable apertures arranged at regular intervals adjacent the periphery so that cap screws may extend therethrough into engagement with threaded holes in the outer race 16. Further, in accordance with the present invention a channel arm 27 is connected to each side of the unit so channel arms engage the outer faces of the covers 17 and 18. The channel arm 27 adjacent its end is provided with a U-shaped recess 28, which has a transverse dimension slightly greater than the diameter of the shaft 12. The channel arm 27 has integrally connected thereto a partly circular cover plate 29 on the top side which preferably is shaped and punched and welded into position. A similar partly circular shaped cover plate 31 is integrally connected to the bottom edge of the channel 27. The cover plate portions 29 and 31 are generally in the plane of the bottom or web portion of the channel 27.

To emphasize this manner of construction, a weld fillet 32 has been shown interconnecting the channel 27 and the cover plate 29. Similarly another weld fillet 33 is interconnects the channel 27 with the cover plate portion 31. At suitable intervals cap screws 34 extend through apertures in the cover plate portions 29 and 31, and apertures in the web of the channel 27 through cooperating apertures in the cover 17 into engagement with threaded holes in the outer race 16. The outer end, or free extremity of the channel 27, is held in a relatively fixed position by a suitable anchorage shown in dotted line representation as comprising two other channel members 35 and 35. It will be noted that a slight clearance is provided between the anchorage members 35 and the end of the channel 27 to allow the backstop to freely center itself to prevent any damage resulting from slight misalignment, since the arm for different size backstops in commercial use ranges from twenty to ninety-six inches. It further is to be noted that the transverse dimension of the channel 27 is of the order of approximately one-half of the diameter of the outer race 16. Since the diameters for outer races range from four and one-half inches to thirty-two inches in commercial units, the channel varies from two and one-half inches to eighteen inches.

By means of the present construction of the cover members and the channel arms, it has been possible to reduce the manufacturing cost of the units, and adequate torque arm operation has been obtained without any material increase in the size of the channel members 27. In order to retain in position the cover members 17 to permit installation of the channel arms 27 subsequent to mounting the backstop unit on a shaft, each cover, such as the cover 17, is provided with suitable recesses 36 so that four cap screws may hold the cover in position, and thus the entire assembly is held together on the shaft 12. The channel arms 27 are attached by means of the cap screws 34. A suitable inset cover plate 37 is held in position by a plurality of cap screws 38 to fill in the gap formed by the U-shaped recess 28 in the arm 27.

Between the cam member 11 and the arm 27 and extending portions 29 and 31, there is located an annular felt washer 42 which is riveted or secured to an annular metal washer 41. The metal washer 41 engages the adjacent surfaces of the arm 27, the extensions 29 and 31 and the cover inset 37. The annular felt ring 42 provides a dust-tight cover for the oil seals 22 and 23 and reduces the possibility of fine dust entering the backstop mechanism. Preferably the supporting washer 41 is retained in position by suitable cooperating members or lugs 43 provided thereon which engage a portion of the arm 27 adjacent the recess 28, only one lug having been illustrated in the figures for each washer 41.

While for the purpose of illustrating and describing the invention a particular embodiment has been shown in the drawing, it is to be understood that the invention is not to be limited thereto since such variations and modifications are contemplated as may be commensurate with the spirit and scope of the invention as defined in the accompanying claims.

I claim as my invention:

1. The combination for a cam unit adapted to be connected to a shaft and having a roller assembly surrounding said cam unit, an outer race for said roller assembly, an annular cover for enclosing the side of said roller assembly, said cover being in engagement with the side of said outer race, said cover having apertures extending transversely therethrough, comprising a channel arm having a transverse dimension substantially less than the diameter of said outer race, said channel arm having at one end a longiutdinal U-shaped recess of a width greater than the diameter of the shaft adapted to be connected to said cam unit, said channel arm having two circular extending cover plate portions integrally connected thereto adjacent the end thereof in the plane of the bottom of said channel, said arm and said circular portions having apertures therein, and fastening members extending through said latter apertures and the apertures in said cover into said roller assembly.

2. The combination for a cam unit adapted to be connected to a shaft and having a roller assembly surrounding said cam unit, an outer race therefor, an annular cover in engagement with the side of said outer race, comprising a channel arm having a transverse dimension less than the diameter of said race, said channel arm having at one end a longitudinal U-shaped recess, said channel arm having two circular extending cover plate portions integrally connected thereto in the plane of the bottom of said channel, and a plurality of fastening members extending through said channel and cover plate portions and through said cover into said roller assembly.

3. The combination for a backstop having a cam unit adapted to be connected to a shaft, a roller assembly surrounding said cam unit, and an outer race for said roller assembly, comprising a channel arm for each of two opposite sides of said backstop having a web extending between edges extending normally from the web, said arm at one end having a U-shaped recess to fit over said shaft, the channel of said arm having a transverse dimension less than the diameter of said unit, said arm at one end adjacent said recess having two extension plates integrally connected to said arm and having peripheral edges conforming to the outer surface of said backstop, said extension plates and the web of the channel having apertures therein for receiving fastening members to engage said outer race.

4. The combination for a backstop having a cam unit adapted to be connected to a shaft, a roller assembly surrounding said cam unit, and an outer race for said roller assembly, comprising a channel arm for each of two opposite sides of said backstop having a web extending between edges extending normally from the web, said arm at one end having a U-shaped recess to fit over said shaft, the channel of said arm having a transverse dimension less than the diameter of said unit, said arm at one end adjacent said recess having two extension plates welded to said arm in the plane of the web of said channel and having peripheral edges conforming to the outer surface of said backstop, said extension plates and the web of the channel having apertures therein for receiving fastening members to engage said outer race.

5. The combination of claim 2 having an annular packing member of sheet metal and felt interposed between the channel arm and said cam unit.

6. The combination of claim 2 having an annular sheet metal member coated on one side with a packing material, said packing material being adjacent the ends of said cam unit, said sheet metal member having at least one lug for engaging the edges of the U-shaped recess of said channel arm.

7. A backstop mechanism comprising a cam unit adapted to engage a shaft, a roller assembly disposed coaxially about the cam unit, an outer race disposed coaxially about the roller assembly, means to lubricate the roller assembly, a seal mounted between the cam unit and outer race on each side of the roller assembly, a channel arm for each of the opposite sides of the backstop, said arm having a U-shaped longitudinal recess at one end to fit about the shaft and a web disposed between two outwardly extending edges, two extension plates welded to the recessed end of each arm in the plane of the web, said plates and recessed end of each arm being secured to the outer race, and a dust cover mounted between each oil seal and the adjacent assembly formed by the arm and extension plates.

No references cited.